(12) United States Patent
Hunter

(10) Patent No.: US 7,057,527 B2
(45) Date of Patent: *Jun. 6, 2006

(54) INSULATED CONTAINER

(75) Inventor: Rick C. Hunter, Friendswood, TX (US)

(73) Assignee: Kodak Thermal Technologies, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/868,156

(22) Filed: Jun. 15, 2004

(65) Prior Publication Data

US 2004/0227643 A1 Nov. 18, 2004

Related U.S. Application Data

(63) Continuation of application No. 09/898,967, filed on Jul. 3, 2001, now Pat. No. 6,771,183.

(60) Provisional application No. 60/215,714, filed on Jul. 3, 2000.

(51) Int. Cl.
*G08C 19/12* (2006.01)
*G08C 19/16* (2006.01)
(52) U.S. Cl. ............................. 340/870.17; 220/592.25
(58) Field of Classification Search ........... 340/870.01, 340/870.11, 870.16, 870.17, 686, 687; 220/592.25, 220/592.2, 592.03, 324, 326
See application file for complete search history.

(56) References Cited

U.S. PATENT DOCUMENTS 6,771,183 B1 * 8/2004 Hunter .................. 340/870.01

* cited by examiner

*Primary Examiner*—Timothy Edwards, Jr.
(74) *Attorney, Agent, or Firm*—Robert Curfiss

(57) ABSTRACT

An advanced thermal container has a thermally insulated open receptacle, a thermally insulated closure member, a data monitoring system incorporated into the container that can send and receive information via wireless communication, and a sealing system to minimize heat transfer and air exchange between the interior and exterior of the container. Hard plastic casing enclosing foam-encased vacuum insulation panels is used to construct the insulated receptacle and closure member. The closure member and receptacle each have an elongated portion with shoulders above and below the elongated portion. When the container is closed, a lower seal and an upper seal are compressed between the mating lower and upper shoulders, respectively. The onboard data monitoring system records important parameters concerning the internal and external environments of the container, particularly temperature information, as well as other significant events such as the number of times the container was opened during transit.

2 Claims, 5 Drawing Sheets

INSULATED CONTAINER

This patent application is a continuation of and claims the priority of a co-pending utility application entitled "Advanced Thermal Container", Ser. No. 09/898,967 having a filing date of Jul. 3, 2001, now U.S. Pat. No. 6,771,183, which claims the benefit of 60/215,714, filed Jul. 3, 2000.

BACKGROUND OF THE INVENTION

1. Field of the Invention

This invention relates to thermal containers, and more particularly to an advanced thermal container for shipping that uses a highly efficient thermal seal and high quality thermal insulation to minimize the exchange of heat and air between the interior and exterior of the container. The advanced thermal container also incorporates a built-in data monitoring system.

2. Description of Prior Art

A wide variety of insulated containers are currently used for shipping temperature sensitive products. Those containers use different types of insulation and refrigeration to maintain a desired thermal environment within the container. A typical prior art thermal shipping container designed to maintain cool temperatures is a polystyrene plastic box with ice or a frozen gelpack inside the box's payload region. A significant problem with this approach is the heat flux through the box walls and the interface between the box and its closing member. Depending on the thermal resistivity of the insulation and the ambient temperature outside the box, the heat leak into the box can be significant. The resulting heat load typically must be convectively carried to the heat reservoir to maintain constant temperature within the box.

Note a similar problem exists in reverse if a hot product is the payload and a heat source such as a hot brick is the heat reservoir. Everything stated below will be limited to the cold payload situation, but the present invention is not limited to that.

Prior art insulated containers have proved unsuitable for products that require tight temperature tolerances. Excessive heat gain can exhaust the heat reservoir, causing the temperature to rise rapidly with additional heat gain. Temperature variation can exceed tolerances because the heat reservoir may absorb too much heat from the product itself, lowering its temperature to an unacceptable level. The temperature gradient within the payload volume may be unacceptably large because the warmer air that accumulates near the top of the container is somewhat removed from the colder air surrounding the heat reservoir lying on the bottom of the box. Depending on the extent of temperature gradient, a payload could conceivably be too cold at the lower end and too warm on the upper end.

Another deficiency of prior art insulated shipping containers involves the recordation, transmission, and reception of data and other information, such as temperature data or computer program instructions. Many data monitoring systems are not integral to the box and sensors are placed in the box wherever they and the payload can be accommodated. In many cases this violates shipping requirements mandating that the warmest location in the box be monitored. Different boxes have different warmest locations and portable sensors often are incorrectly placed for a particular box. Portable monitors also require an adjustment period after being initially placed in the box before they can provide accurate data. Thus, at the critical time of initial loading of the payload, when the monitor is simultaneously placed in the box, accurate monitoring is not possible.

SUMMARY OF THE INVENTION

The present invention uses an innovative design to produce an advanced thermal container having a thermally insulated open receptacle, a thermally insulated closure member, a data monitoring system incorporated into the container that can send and receive information via wireless communication, and a sealing system to minimize heat transfer and air exchange between the interior and exterior of the container. Hard plastic casing enclosing foam-encased vacuum insulation panels is used to construct the insulated receptacle and closure member. The closure member and receptacle each have an elongated portion with shoulders above and below the elongated portion. When the container is closed, a lower seal and an upper seal are compressed between the mating lower and upper shoulders, respectively. The onboard data monitoring system records important parameters concerning the internal and external environments of the container, particularly temperature information, as well as other significant events such as the number of times the container was opened during transit.

BRIEF DESCRIPTION OF THE DRAWINGS

So that the manner in which the described features, advantages and objects of the invention, as well as others which will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings.

DETAILED DESCRIPTION

Figure 1:
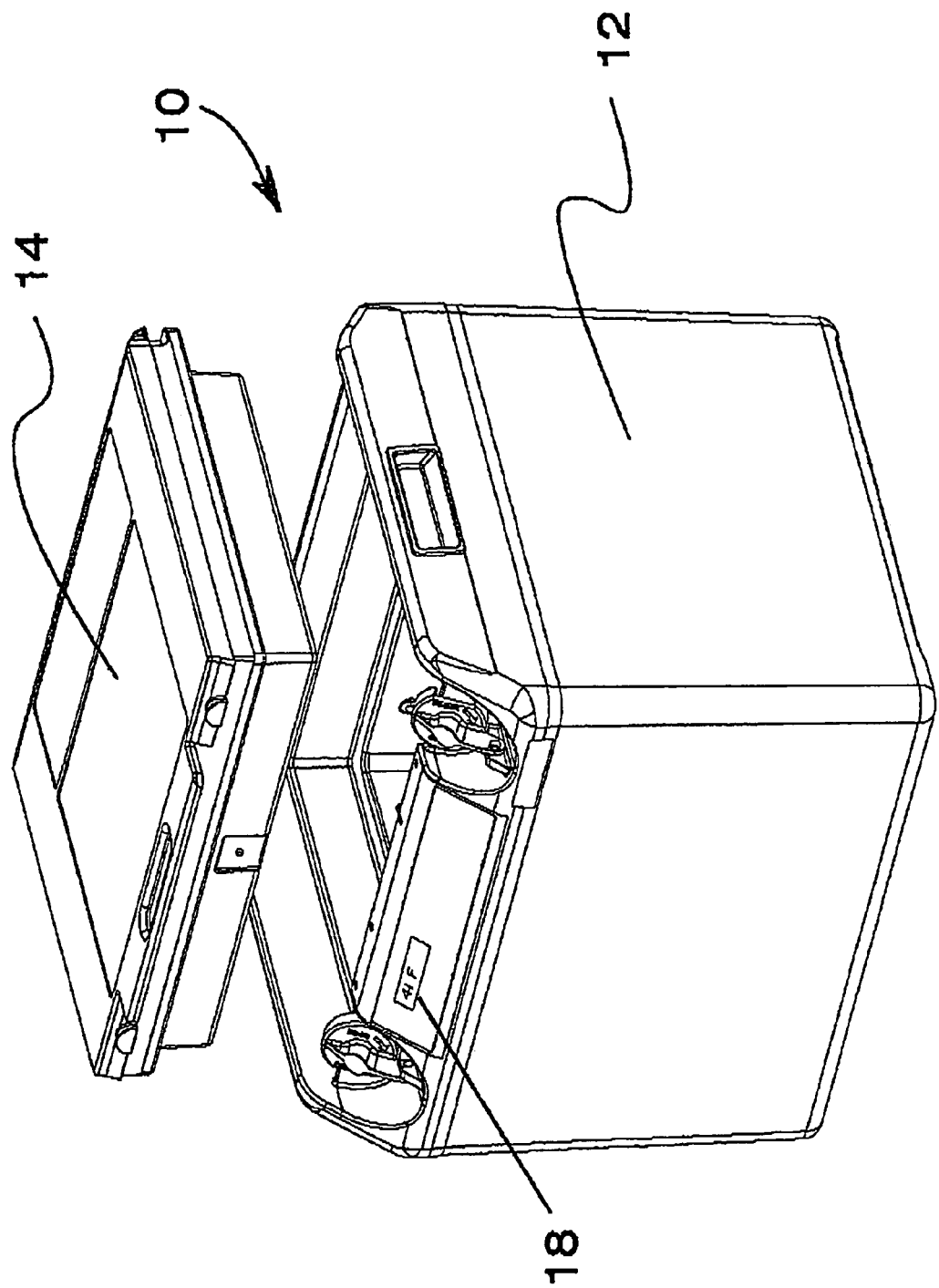
FIG. 1 is an isometric view of an advanced thermal container constructed in accordance with the present invention.
Figure 2:
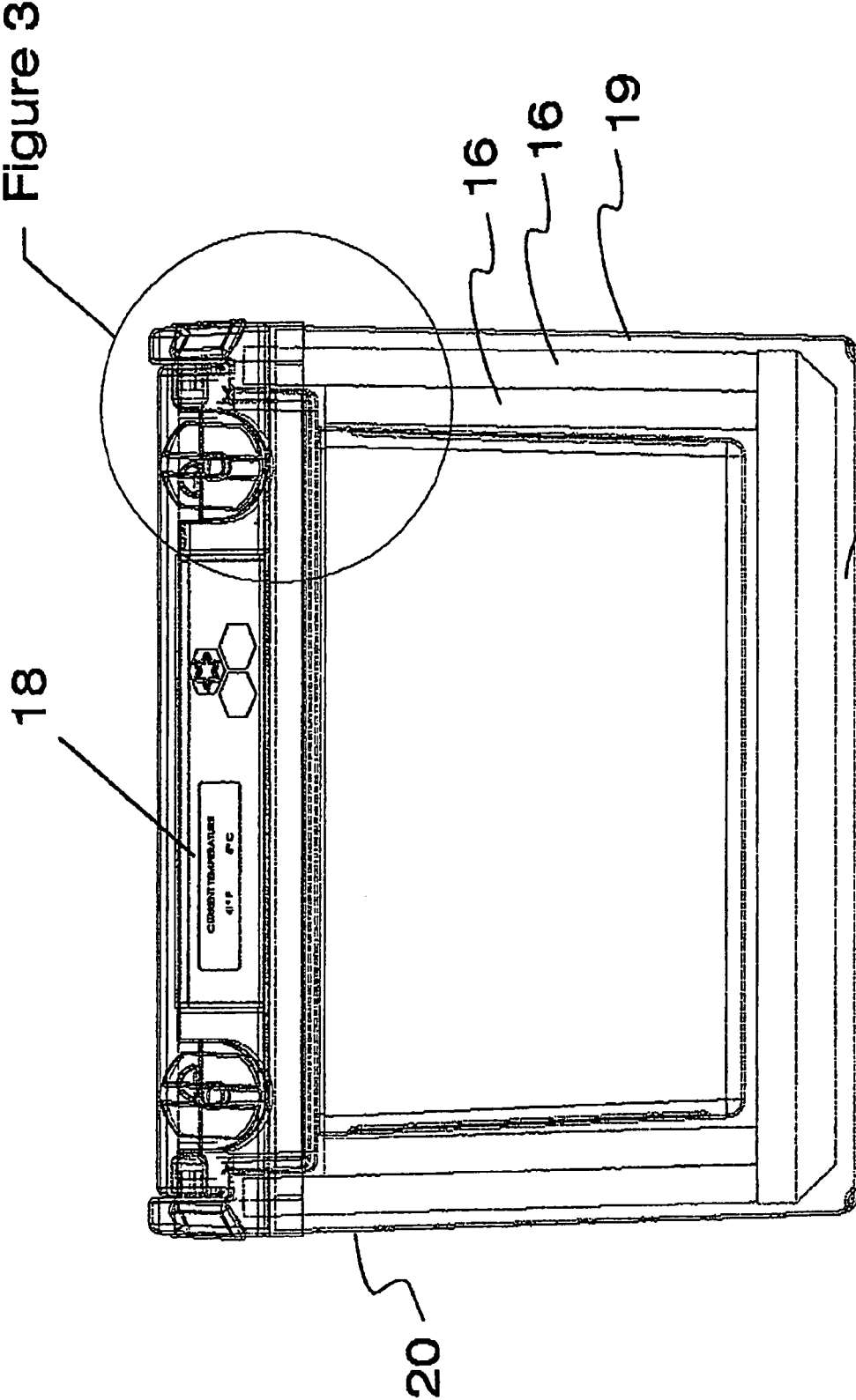
FIG. 2 is an elevation view of the advanced thermal container of FIG. 1, but showing certain structural elements in phantom view.

Referring to FIG. 1, advanced thermal container 10 comprises an open receptacle 12 and closure member 14, both of which are constructed using a highly efficient thermal insulation material such as vacuum insulation panels 16 (FIG. 2). A data monitoring system 18 is incorporated into the container 10.

Vacuum Insulation Panels (VIPs) are well known thermal insulators. They typically comprise a filler material, a barrier film, and a gettering material. The filler material is commonly an open-celled foam or a powder. The barrier film generally adheres to a core layer such as a sheet of polyester, polypropylene, or nylon. Although highly efficient as thermally insulators, VIPs are notoriously fragile. If the barrier film is damaged by abrasion or puncture, a VIP loses much or all of its insulation capability. To improve the reliability of the VIPs, the present invention encases the VIPs 16 with foam 19, as shown in FIG. 2. The foam 19 protects the VIPs 16 and secures them in place. The foam 19 also fills air gaps that are normally present between panels and seals the panels, protecting them from infiltrating moisture. The foam-encased VIPs 16 are themselves encased and protected by a thin, lightweight, durable shell 20.

Figure 3:
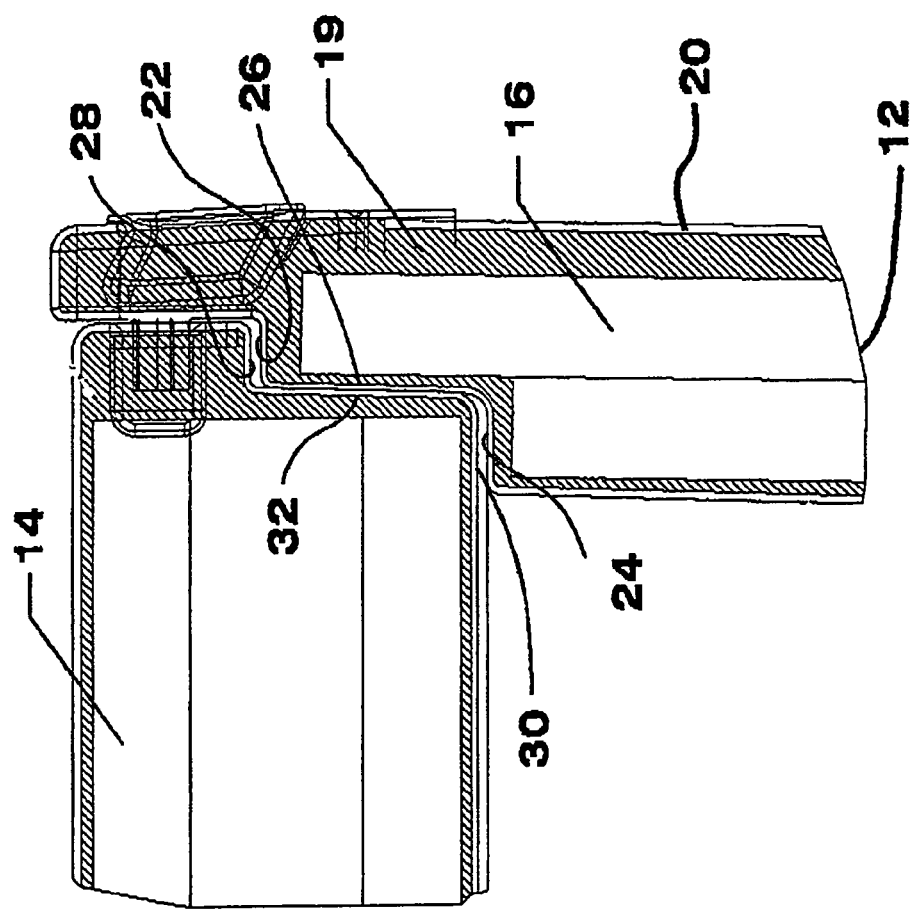
FIG. 3 is an enlargement of a portion of the advanced thermal container of FIG. 2, as identified in FIG. 2.
Figure 4:
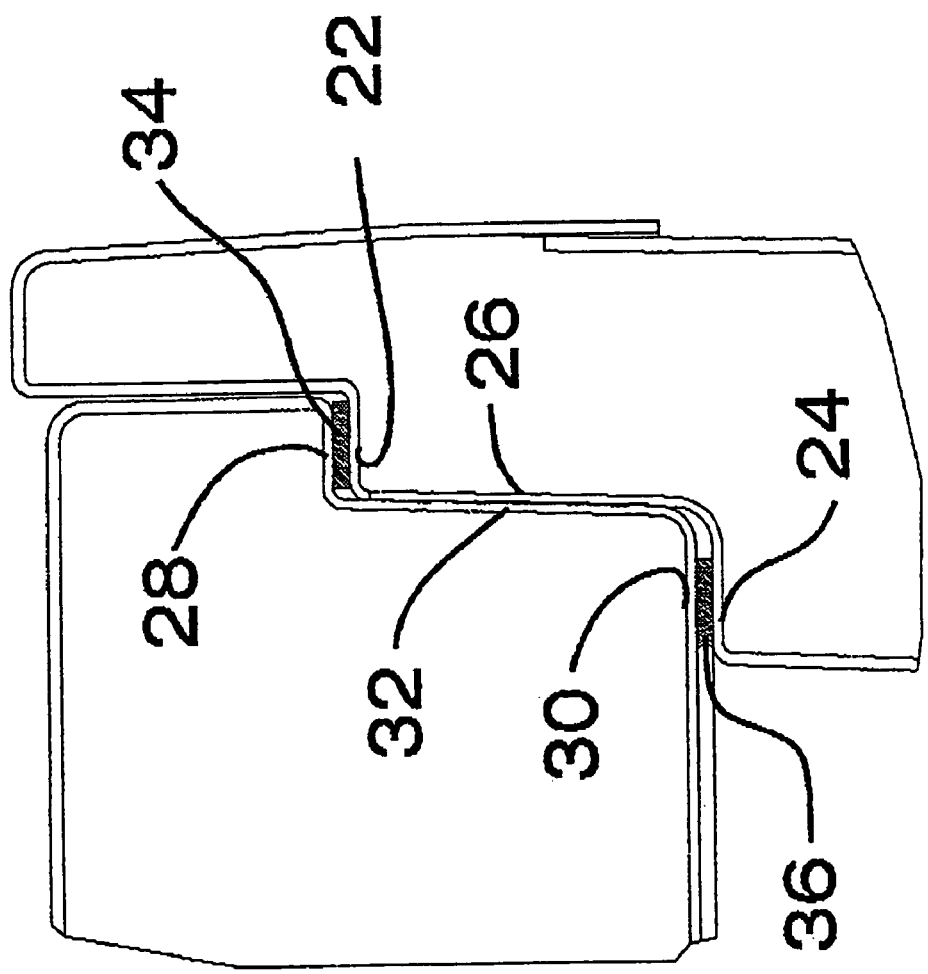
FIG. 4 is a further enlargement of a portion of the advanced thermal container of FIG. 3.

To further enhance the thermal insulation properties of advanced thermal container 10, an efficient seal design can be used, as shown in FIGS. 3 and 4. In that embodiment, receptacle 12 has a first receptacle shoulder 22 and a second receptacle shoulder 24. Shoulders 22, 24 are separated by an elongated section 26 of receptacle 12. Closure member 14 has corresponding first and second closure shoulders 28 and 30, respectively, and a corresponding elongated section 32. When closure member 14 closes receptacle 12, corresponding elements 28, 30, and 32 of closure member 14 mate with their counterparts 22, 24, and 26, respectively, on receptacle 12.

First seal 34 is located between first receptacle shoulder 22 and first closure shoulder 28. Second seal 36 is located between second receptacle shoulder 24 and second closure shoulder 30. Again, when closure member 14 closes receptacle 12, first seal 34 is compressed to form an airtight and thermally resistive seal. Second seal 36 may or may not be airtight, but it is a thermally resistive seal. Elongated sections 26 and 32 are generally transverse to and have lengths greater than the widths of shoulders 22, 24, 28, and 30. The longer lengths of elongated sections 26 and 32 relative to the widths of shoulders 22, 24, 28, and 30 add significant thermal resistance to prevent heat transfer between and through seals 34 and 36.

Figure 5:
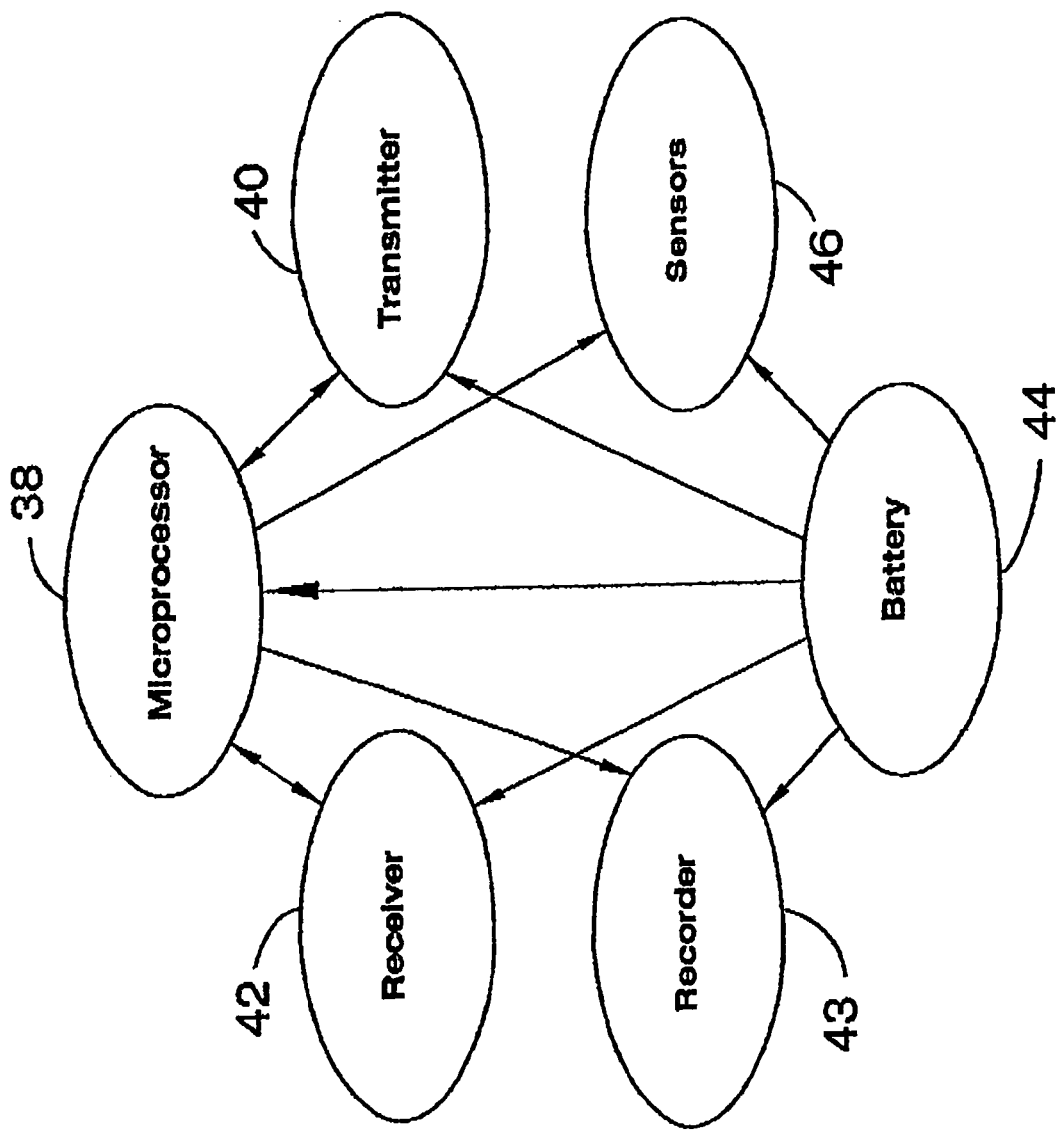
FIG. 5 is a block diagram illustrating the components of an embodiment of a data monitor constructed in accordance with the present invention.

A preferred embodiment of data monitor system 18 of container 10, as shown in block diagram form in FIG. 5, comprises a microprocessor (central processing unit) 38, a transmitter 40, a receiver 42, a recorder 43, a battery 44, and sensors 46. Sensors 46 are strategically placed in or on container 10 to best sense the particular physical parameters they are intended to monitor. For example, a temperature sensor 46 may be placed in the known warmest location of receptacle 12 so that the warmest temperature to which a payload is subjected is known. Another sensor 46 may count the number of times receptacle 12 is opened while containing a payload.

Data from sensors 46 can be recorded by recorder 43 or processed by microprocessor 38. Microprocessor 38 can sound an audible or visual alarm if pre-programmed ranges for certain parameters are violated. It can also send processed information to transmitter 40 so that a remote operator could monitor the thermal environment inside and outside of container 10 and cause remedial action to be taken, if necessary. Receiver 42 can receive instructions from a remote operator such as instructions to transmit data upon remote command. Transmitter 40 and receiver 42 can operate using hardwired or wireless communication. Battery 44 provides electrical power to the components comprising data monitor 18.

The present invention offers many advantages over the prior art. The combined use of high quality thermal insulation materials and an innovative sealing system provides a container having excellent thermal properties for isolating the thermal environment within the container. By encasing fragile vacuum insulation panels in foam, and encasing the foam-encased vacuum panels in a hard shell, vacuum insulation panels can be used even in the relatively harsh application of a shipping container. Data and other information, such as program instructions, can be stored, transmitted, and received by including a built-in data monitor system.

While the invention has been particularly shown and described with reference to a preferred and alternative embodiments, it will be understood by those skilled in the art that various changes in form and detail may be made therein without departing from the spirit and scope of the invention.

What is claimed is:

1. A method of maintaining a thermal environment in a container having a thermally insulated receptacle defining an interior and an exterior of the container, a thermally insulated closure member to open and close the thermally insulated receptacle, and an onboard, sensor having a power source within the container, comprising the steps of:
   a. sensing the temperature by the sensor in the interior of the container when the insulated closure member is in place to close the receptable, the data monitor adapted to generate a temperature data signal; and
   b. transmitting the temperature data signal from the sensor to a central receiver located at a location remote from the container and the monitor.

2. The method of claim 1, in which the step of transmitting the temperature data signal to the central receiver is performed using wireless communication.

* * * * *

UNITED STATES PATENT AND TRADEMARK OFFICE
CERTIFICATE OF CORRECTION

PATENT NO. : 7,057,527 B2  Page 1 of 1
APPLICATION NO. : 10/868156
DATED : June 6, 2006
INVENTOR(S) : Rick C. Hunter It is certified that error appears in the above-identified patent and that said Letters Patent is hereby corrected as shown below:

In claim 1, at column 4, line 41 the words "data monitor" should be --sensor--.

In claim 1, at column 4, line 45, the word "monitor" should be --sensor--.

Signed and Sealed this

Sixth Day of November, 2007

JON W. DUDAS
*Director of the United States Patent and Trademark Office*